United States Patent
Weisberg

(10) Patent No.: US 7,376,605 B2
(45) Date of Patent: May 20, 2008

(54) ELECTRONIC MARKET CALENDAR FOR DISPLAYING STANDARD SETTLEMENT DATES, FUTURE MARKET-RELATED EVENTS AND HOLIDAYS PERTAINING TO A FINANCIAL TRANSACTION

(75) Inventor: Philip Weisberg, New York, NY (US)

(73) Assignee: FX Alliance, LLC, New York, NY (US)

(*) Notice: Subject to any disclaimer, the term of this patent is extended or adjusted under 35 U.S.C. 154(b) by 1256 days.

(21) Appl. No.: 10/066,780

(22) Filed: Feb. 6, 2002

(65) Prior Publication Data

US 2003/0147309 A1 Aug. 7, 2003

(51) Int. Cl.
G06Q 40/00 (2006.01)
G06Q 10/00 (2006.01)
G06Q 30/00 (2006.01)
G04B 19/24 (2006.01)
G04C 17/00 (2006.01)

(52) U.S. Cl. .............................. 705/35; 705/1; 705/37; 368/29

(58) Field of Classification Search .................. 705/34, 705/37, 35, 1; 368/29
See application file for complete search history.

(56) References Cited

U.S. PATENT DOCUMENTS

| 6,018,343 | A | 1/2000 | Wang et al. |
| 6,064,975 | A * | 5/2000 | Moon et al. .................... 705/8 |
| 6,141,005 | A | 10/2000 | Hetherington et al. |
| 6,347,307 | B1 * | 2/2002 | Sandhu et al. ............ 705/36 R |
| 6,369,840 | B1 | 4/2002 | Barnett et al. |
| 2001/0027438 | A1 * | 10/2001 | Park ............................ 705/38 |
| 2002/0087447 | A1 * | 7/2002 | McDonald et al. ........... 705/36 |

OTHER PUBLICATIONS

Briefing.Com, Feb. 21, 1999.*
John Rivett-Carnac, "An Object-Oriented Framework for Transaction Capture Using Co-operating Business Rule Components," 1997, IEEE, pp. 126-134.*

* cited by examiner

*Primary Examiner*—Jagdish N Patel
*Assistant Examiner*—Kenneth L Bartley
(74) *Attorney, Agent, or Firm*—Law Offices of Grady L. White, LLC

(57) ABSTRACT

An electronic market calendar that identifies settlement dates, holidays, market-related events, and provides links to news, information and research materials, pertaining to certain transaction terms, currencies or territories. The invention displays or provides a market calendar in which each one of a plurality of calendar dates that corresponds to a settlement date, a market-related event date or a holiday is displayed in a visibly distinct manner from the rest of the calendar dates. The set of market-related events may include, for example, events such as national elections, publications of economic forecasts, releases of economic reports, monetary policy announcements, trade announcements, interest rate announcements, press releases, governmental hearings, federal open market committee meetings, financial summit meetings, or any other events related to the market in which the electronic market calendar is applied.

29 Claims, 6 Drawing Sheets

USD Redbook Retail S|s for Feb 2 Wk (last
4.0% 3 wks Jan/3 wk Dec)
USD FHLMC Auctions 3|Mos Reference Bills
USD [Greenspan] Test|fies Before Senate
Banking. Housing & Urban
USD FHLB Auctions 1, 2, 3, 6 Mos Weekly
Disco Notes (e $2-7B)
USD Treasury Auctions reopened 5-Yr Notes
($16 Bln); Settle Feb 15
EUR CIPS Services
EUR Business Climate IdxJan n/f -1.23 n/a
n/a
EUR Unemployment Rate

06 Wednesday February 2002

USD Productivity pQ4 1.0% 1.5% 1.5 1.0- 2.0
USD Unit
USD Treasury Auctions new 10-Yr Notes ($13
Bln); Settle Feb 15

07 Thursday February 2002

USD Initial Claims 2/2 400K n/a 400 400- 400
USD Consumer
USD FHLB Auctions 1, 2, 3, 6 Mos Weekly
Disco Notes (e $2-7B)
USD Fed releases Dec consumer credit figures
EUR GDP (est)
EUR GDP (fin)
EUR GDP (fin)

```
Settlement Dates
   List Area
      450
```

```
News and Research
    Links Area
       455
```

| 24 | 25 | 26 | 27 | 28 | 29 | 30 |
|----|----|----|----|----|----|----|
| 290 | 291 | 292 | 293 | ■294 | 295 | 296 |

| 29 | 30 | 31 | | |
|----|----|----|---|---|
| 325 | 326 | 327 | | |

11  January 2003

| SUN | MON | TUE | WED | THU | FRI | SAT |
|-----|-----|-----|-----|-----|-----|-----|
|  |  |  | 1 | 2 | 3 | 4 |
|  |  |  | 328 | 329 | 330 | 331 |
| 5 | 6 | 7 | 8 | 9 | 10 | 11 |
| 332 | 333 | 334 | 335 | 336 | 337 | 338 |
| 12 | 13 | 14 | 15 | 16 | 17 | 18 |
| 339 | 340 | 341 | 342 | 343 | 344 | 345 |
| 19 | 20 | 21 | 22 | 23 | 24 | 25 |
| 346 | 347 | 348 | 349 | 350 | 351 | 352 |
| 26 | 27 | 28 | 29 | 30 | 31 |  |
| 353 | 354 | 355 | 356 | 357 | 358 |  |

12  February 2003

| SUN | MON | TUE | WED | T |
|-----|-----|-----|-----|---|
|  |  |  |  |  |
| 2 | 3 | 4 | 5 |  |
| 360 | 361 | 362 | 363 |  |
| 9 | 10 | 11 | 12 | 1 |
| 367 | 368 | 369 | 370 |  |
| 16 | 17 | 18 | 19 | 2 |
| 374 | 375 | 376 | 377 |  |
| 23 | 24 | 25 | 26 | 2 |
| 381 | 382 | 383 | 384 |  |

Forward Dates

| MONTH | DATE | DAYS FROM SPOT |
|-------|------|----------------|
| 1W | 14 Feb 2002 | 7 |
| 1M | 07 Mar 2002 | 28 |
| 2M | 08 Apr 2002 | 60 |
| 3M | 07 May 2002 | 89 |
| 4M | 07 Jun 2002 | 120 |
| 5M | 08 Jul 2002 | 151 |
| 6M | 07 Aug 2002 | 181 |
| 7M | 09 Sep 2002 | 214 |
| 8M | 07 Oct 2002 | 242 |
| 9M | 07 Nov 2002 | 273 |
| 10M | 09 Dec 2002 | 305 |
| 11M | 07 Jan 2003 | 334 |
| 1Y | 07 Feb 2003 | 365 |

Get Latest Research

Click on the link below to view research from selected items

EUR USD

FIG. 4B

ELECTRONIC MARKET CALENDAR FOR DISPLAYING STANDARD SETTLEMENT DATES, FUTURE MARKET-RELATED EVENTS AND HOLIDAYS PERTAINING TO A FINANCIAL TRANSACTION

FIELD OF THE INVENTION

The present invention relates generally to the field of computerized calendar programs, and more particularly to computerized calendar programs that calculate, provide or display transaction settlement dates, market-related event dates and holidays.

RELATED ART

More and more often businesses and individuals are engaging in financial transactions that span international borders. In today's economy, many products and services are bought, sold and traded freely among buyers, sellers and traders around the world. Using modern computing and telecommunications systems, participants engaged in these transactions conduct their business twenty-four hours a day, seven days a week.

In many of the markets where these transactions take place, there is a lapse of time—sometimes a substantial lapse of time—between the date the deal is made (referred to as the "transaction date") and the date the deal is executed (generally called the "settlement date" or "value date"). In the foreign exchange market, for example, market participants agree to exchange a certain amount of one currency for a certain amount of another currency on a specified future date. The settlement date is the date the exchange of the two currencies actually occurs, which could be a day, two days, a week, a month, six months, or even a year or more after the transaction date.

When market participants select settlement dates for their transactions, among other things, it is important to consider national, state, corporate and bank holidays in the countries that use or supply the products, services or currencies involved in the transactions. Market participants strive to avoid selecting settlement dates upon which the businesses involved in the transactions are likely to be closed. A foreign exchange trader dealing in U.S. dollars, for example, typically will not select a settlement date of July $4^{th}$. While other banks and businesses around the world will be open for business on July $4^{th}$, most, if not all, of the banks in the United States will be closed for Independence Day. The same could be said for many other U.S.-only holidays, such as Veteran's Day, Columbus Day, Thanksgiving, Martin Luther King's Birthday and President's Day.

Like the United States, most countries have their own set of holidays, of which only a few are observed in other countries around the world. Thus, while it might be relatively easy during a transaction negotiation to verify that a proposed settlement date is not likely to be a bank holiday in one's own country, it has been found by traders and others in the industry to be both difficult and time-consuming to ensure, during the negotiation, that the proposed settlement date is not a holiday in all of the effected countries.

Various systems and methods for displaying calendars highlighting holidays have been proposed. U.S. Pat. No. 6,064,975, for example, entitled "APPARATUS AND METHOD FOR HIGHLIGHTING HOLIDAYS OF A SPECIFIED LOCATION IN A CALENDAR SOFTWARE APPLICATION" (incorporated by reference into this specification), describes an apparatus and method for highlighting holidays pertaining to a specified geographical location. Similarly, U.S. Pat. No. 6,141,005, entitled "COMBINED DISPLAY OF LOCALE-SENSITIVE CALENDARS IN A DISTRIBUTED COMPUTER ENTERPRISE ENVIRONMENT" (also incorporated by reference into this specification), describes a method of displaying a set of holiday objects on a display device in a distributed computing environment according to the locale of the display device.

Among other shortcomings, these proposed solutions for identifying holidays in various locales do not provide market-related events or standard settlement dates related to a proposed transaction. Market-related events, such as public announcements regarding interest rates, monetary policy, economic indicators, corporate earnings and the supply and demand for certain products, for instance, may have a significant impact on the value and/or execution of a given transaction at the time of settlement. In Japan, for example, the release of meeting minutes from the TANKAN meeting, which is a meeting concerning the economic outlook in Japan, is considered a "market-moving" event. Consequently, market participants attempt to take such market-related events into account when making decisions about proposed settlement dates. A purchaser of a stock option, for example, would normally want the option to expire after the occurrence of a market-related event, while the seller of a stock option would probably want the option to expire before the market-related event. Other market-related events include, for example: national elections; the publication of economic forecasts or reports; the release of monetary, trade or regulatory policy announcements; congressional or other governmental hearings concerning the market or featuring testimony from an important market official (such as the Chairman of the United States Federal Reserve Board); or important market-related meetings or summits.

As a matter of convenience, it is customary in some markets for participants engaged in negotiating these transactions to rely on a set of standard settlement dates. In the foreign exchange market, for example, dealers and traders work with and rely on a set of standard settlement dates, which are calculated relative to the transaction date. The dealers and traders understand, for instance, that a standard "spot" transaction will settle on the second business day after the deal is made, and a standard "forward" transaction will settle one, two, three, six or twelve months after the spot settlement date. Sometimes these standard forward settlement dates are referred to as "forward tenors." In practice, market participants will either select one of the standard settlement dates for settlement, or agree upon a different day.

The proposed solutions also do not provide access to news, information and research materials concerning the actual and potential impact of the market-related events. Users typically have to resort to several different resources to obtain all of this information. Currently, the process of collecting all of the information necessary to select the best settlement date is time-consuming, manually intensive and, as a result, very susceptible to human error.

Accordingly, there is a need for a system that will not only identify holidays associated with a particular locale, but also provide standard settlement dates, intervening market-related events, and access to news, forecasts and research pertaining to a selected or proposed settlement date, all in an efficient and timely manner.

SUMMARY OF THE INVENTION

In general, the invention comprises a computer-readable storage medium encoded with a program executable by a computer for display of an electronic market calendar. The electronic market calendar comprises a plurality of calendar dates, a set of settlement dates pertaining to a set of transaction terms, and a set of market-related events pertaining to the set of transaction terms. Each one of the plurality of calendar dates that corresponds to a settlement date or a market-related event, is displayed in a visibly distinct manner from the rest of the calendar dates. The set of market-related events may include, for example, events such as national elections, publications of economic forecasts, releases of economic reports, monetary policy announcements, trade announcements, interest rate announcements, press releases, governmental hearings, federal open market committee meetings, financial summit meetings, or any other event related to or having an influence on the market in which the electronic market calendar is used.

In a further aspect of the present invention, the computer-executable program is further configured to identify a set of holidays pertaining to a territory. The identification of holidays may be accomplished, for example, by displaying calendar dates that correspond to holidays in a visibly distinct manner from the calendar dates that do not correspond to holidays. In a preferred embodiment, the territory could be a state, country, geographic region, continent, a plurality of countries, or even the entire world. Usually, but not necessarily, the territory will be determined by reference to the transaction currency designation. However, a user may also select the territory without regard for the transaction currency designation.

In yet another aspect of the present invention, the program encoded in the computer-readable storage medium is operable in two modes. In the first mode of operation, the program is configured to display the set of settlement date, and the market-related events that fall within one month of the transaction date. In the second mode of operation, the program is configured to display the set of settlement dates and the set of market-related events that fall within one year of the transaction date, or both.

An electronic market calendar in accordance with the present invention may also be comprised of a combination of computer hardware and software components. In this embodiment, the electronic market calendar comprises: a first memory storage area containing a plurality of market-related event data sets, each market-related event data set pertaining to at least one of a plurality of territories; an event-date generator configured to generate a set of market-related event dates based on a set of transaction terms and at least one of the plurality of market-related event data sets; a settlement date calculator configured to generate a set of settlement dates pertaining to the set of transaction terms; and a display controller, responsive to the event-date generator and the settlement date calculator, configured to display a calendar comprising a plurality of calendar dates, including the set of market-related event dates and the set of settlement dates. In this aspect of the present invention, each one of the plurality of calendar dates that is a member of the set of market-related event dates is displayed in a visibly distinct manner from each one of the plurality of calendar dates that is not a member of the set of market related event dates. In addition, each one of the plurality of calendar dates that is a member of the set of settlement dates is displayed in a visibly distinct manner from the rest of the calendar dates.

In a preferred embodiment of the electronic market calendar according to this aspect of the present invention, there is a second memory storage area containing a plurality of holiday data sets, each holiday data set pertaining to one of the plurality of territories, and a holiday date generator configured to generate a set of holiday dates based on the set of transaction terms and at least one of the plurality of holiday data sets. In this embodiment, each one of the plurality of calendar dates that is a member of the set of holiday dates is visibly distinguished from the rest of the calendar dates. The electronic market calendar may optionally provide an input control facility configured to accept from a user a selection of the set of transaction terms, including for example, the transaction currency designation.

In yet another embodiment of the present invention, a method for displaying a market calendar, is provided. An embodiment of the method comprises the steps of: (1) generating a set of market-related event dates pertaining to a set of transaction terms; (2) generating a set of settlement dates pertaining to the set of transaction terms; and (3) displaying a calendar having a plurality of calendar dates, including the set of settlement dates and the set of market-related event dates. In this embodiment, each one of the plurality of calendar dates that is a member of the set of market-related event dates is visibly distinguished from the rest of the calendar dates, and each one of the plurality of calendar dates that corresponds to one of the settlement dates is visibly distinguished from the rest of the calendar dates. The method may optionally include the steps of generating a set of holiday dates pertaining to the set of transaction terms, and displaying each one of the plurality of calendar dates that is a member of the set of holiday dates in a visibly distinct manner from the rest of the calendar dates. In a preferred embodiment, the method also includes the step of providing an input control configured to receive the set of transaction terms from a user.

In yet another embodiment of the present invention, a graphical user interface for an electronic market calendar in accordance with the present invention, is provided. The interface comprises a first display region having a user-activatible control configured to receive a set of transaction terms from a user, a second display region configured to identify, for a selected calendar month, a set of settlement dates pertaining to the set of transaction terms, and a third display region configured to identify, for a selected time-period, a second set of settlement dates pertaining to the set of transaction terms. The interface may optionally include a fourth display region configured to identify a set of holiday dates pertaining to the set of transaction terms. The selected time-period may comprise, for example, the twelve-month period immediately following the selected calendar month. The interface may also include user-activatible controls configured to facilitate performing market-related research, or to display market-related news items and market-related events.

The invention may be applied in the financial markets, such as the stock market or the foreign exchange market; but it also finds practical application in any market or industry where intervening market- or industry-related events or holidays may influence decisions about transaction settlement dates. Thus, besides the stock-trading and foreign exchange markets, the present invention can be beneficially applied in other contexts, such as the food and agriculture business, commodity trading, the mortgage loan industry, clothing, energy and fuel businesses, and housing development, just to name a few.

Features and Advantages of the Present Invention

It is a feature of the present invention that it provides calendar information in a manner that identifies market-related event dates, as well as settlement dates and holidays pertaining to selected markets, transaction terms and territories.

It is another feature of the present invention that the market-related event and holiday data can be filtered according to user preference. Thus, a user who wishes to view upcoming market-related events and holidays only for the United States and Germany can filter out or "hide" market-related event and holiday data for other regions or territories.

It is yet another feature of the present invention that it may be configured to provide access to news, research, and forecasts about selected markets, and the news, research and forecast data also can be filtered according to user-preference.

It is yet another feature of the present invention that it can calculate settlement dates, and identify market-related events and holidays based on any date selected by a user. Accordingly, a user may use the invention to view potential settlement dates and intervening market-related events that will apply to transactions the user expects to execute on a date in the future.

It is still another feature of the present invention that it is multilingual; the calendar information, settlement dates, market-related event and holiday data may be displayed in a language selected by a user or, alternatively, in the language most appropriate for the market transaction.

An advantage to using the present invention is that settlement dates, market-related event dates, holidays, market news and research can all be obtained from a single resource, thereby relieving market participants, such as traders or dealers, from the time-consuming chore of consulting multiple references to obtain the same information provided by the invention.

Additional features and advantages of the present invention are set forth in part in the description that follows, and in part are apparent from the description, or may be learned by practice of the invention. The features and advantages of the invention may also be realized and attained by means of the instrumentalities and combinations particularly set out in the appended claims.

BRIEF DESCRIPTION OF THE FIGURES

The accompanying drawings, which are incorporated in and constitute part of the specification, illustrate preferred embodiments of the invention, and, together with the description, serve to explain and illustrate the principles of the present invention.

FIGS. 4A and 4B show another exemplary embodiment of a user interface screen configured, in accordance with another aspect of the present invention, to display both a one-month and one-year view of a calendar of settlement dates, holidays and market-related events. FIGS. 4A and 4B also illustrate how a user interface screen configured in accordance with the present invention may provide controls for receiving user input and for obtaining access to additional news, information and research materials pertaining to a set of transaction terms, a currency selection or a set of market-related events.

DETAILED DESCRIPTION OF THE PREFERRED EMBODIMENTS

Reference will now be made in detail to preferred embodiments of the invention, examples of which are illustrated in the accompanying drawings. Notably, the present invention may be implemented using software, hardware or any combination thereof, as would be apparent to those of ordinary skill in the art, and the figures and examples described below are not meant to limit the scope of the present invention or its embodiments or equivalents.

Overview of a Preferred Embodiment of the Present Invention

In a preferred embodiment, an electronic market calendar in accordance with the present invention is populated according to the market, territory or currency in which the user is dealing. If the user elects to see a U.S. dollar-based calendar for foreign exchange transactions, for instance, the electronic market calendar of the present invention will show the U.S. holidays, and based on a selected transaction date, it will show the settlement dates for the common forward tenors (when trades for one week, one month, two months, and so on, will be settled) for a transaction. In addition, the electronic market calendar of the present invention will show which, if any, market-related events will occur in the United States on or near the transaction date, or on or near any of the selected or proposed settlement dates. Preferably, the electronic market calendar also can be configured to show market-related events and holidays that will occur in the period between the transaction date and a potential settlement date.

Detailed Operation of an Embodiment of the Present Invention

Figure 1:
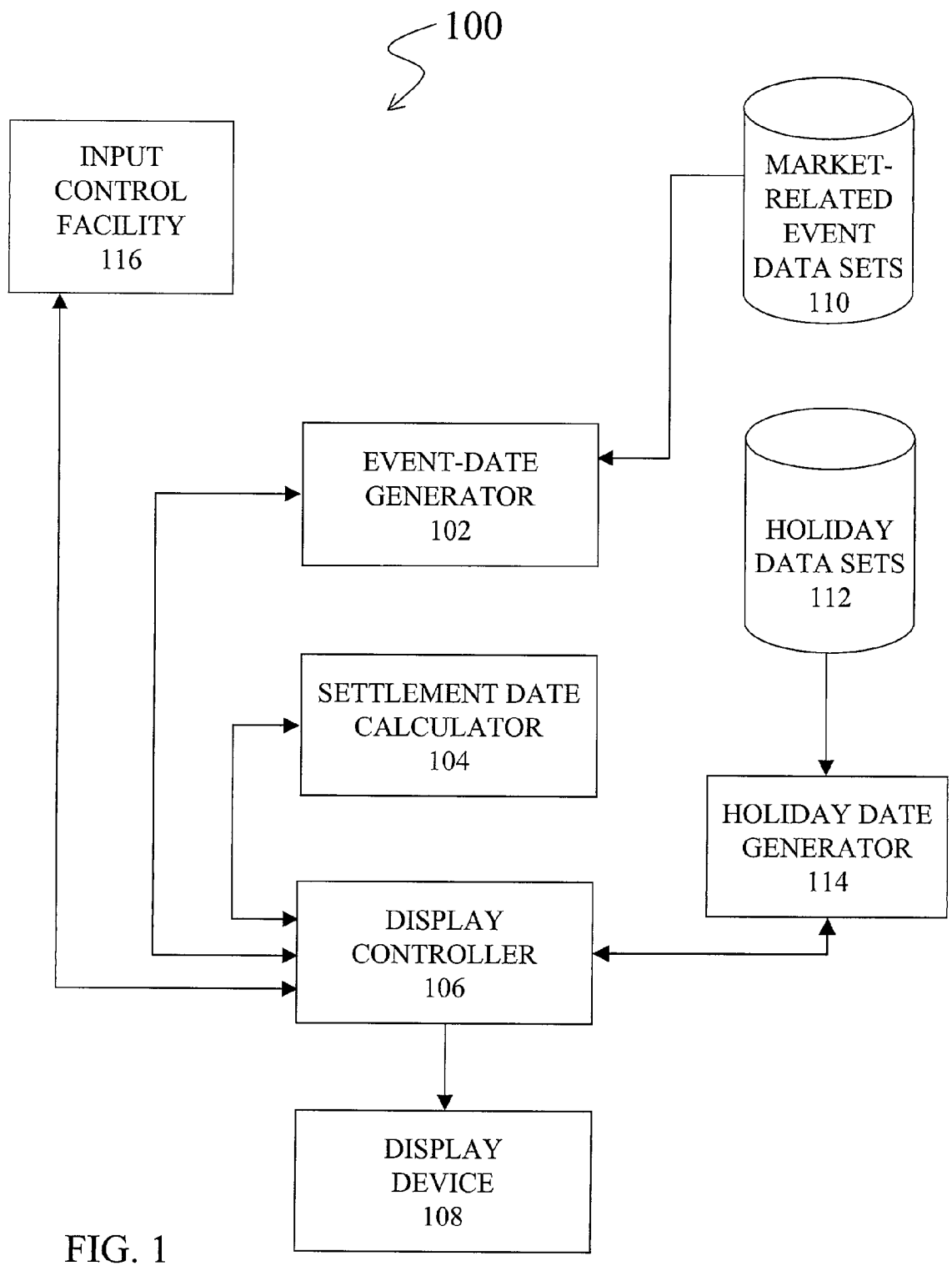
FIG. 1 is a block diagram illustrating an embodiment of an electronic market calendar configured in accordance with the present invention.

With reference now to FIG. 1, a block diagram of one embodiment of a electronic market calendar system configured in accordance with the present invention is shown. As shown in FIG. 1, a preferred embodiment of an Electronic Market Calendar 100 comprises an Event-Date Generator 102, a Settlement-Date Calculator 104, a Display Controller 106, a Display Device 108 and Input Control Facility 116. Event-Date Generator 102 is coupled to a memory storage area, pictured in FIG. 1 as Market-Related Event Data Sets 110, which contains a multiplicity of market-related event data sets, each data set containing a list of market-related events for a region, territory or currency that is covered by the calendar. The region or territory may be as large as the entire world, as small as a city or community, or any size in between, depending on the nature of the market in which the system is being used. As noted above, the system may be applied in many different markets, including but not limited to, the financial markets, agriculture, clothing, food, commercial and residential mortgage loans, or just about any other transaction involving an agreement to settle or execute the transaction on a specified future date.

In a preferred embodiment, the data set for each region, territory or country would include any market-related event scheduled to take place in that region, territory or country, that might have an effect on a selected or proposed transaction in the market, or might otherwise be of interest to users engaged such a transaction. In the foreign exchange market, for instance, such market-related events may include political elections, national and international trade announcements, international trade agreements taking effect or expiring, monetary policy meetings or announcements, or speeches or appearances before Congress or other organizations by high-ranking monetary policy officials, such as the chairman of the Federal Reserve Board. In other contexts, such market-related events might include: the release of corporate earnings statements; production and inventory forecasts; announcements concerning unemployment figures, inflation, trade deficits, or housing; the release of a highly-anticipated new computing platform; or the expiration of an important corporate or government contract, license agreement or patent. Since there are so many countries in the world with their own sets of important economic and business standards, and their own sets of economic and business solutions to problems and issues, the number and scope of events that might influence transactions in a given market could grow to be quite large. Accordingly, the data sets contained in Market-Related Event Data Sets 110 are preferably organized and managed, as is known in the art, by a fast hierarchical, relational, object-oriented or extended markup language (XML) database management system to accommodate fast retrieval by Event-Date Generator 102.

In operation, Event-Date Generator 102 is configured to retrieve market-related events from Market-Related Event Data Sets 110 based on a set of transaction terms submitted or selected by a user through Input Control Facility 116, or otherwise provided by automated means, such as with another computer process (not depicted in FIG. 1). In an embodiment, the transaction terms may comprise a transaction type, a transaction date and a transaction currency designation. Examples of transaction types include, among other things: foreign exchange transactions, such as spot transactions, currency swaps or forward contracts; futures contracts; money market transactions; bond transactions; derivative contracts; and option contracts. The transaction type may also comprise securities transactions, cash market transactions, wholesale or retail sales transactions, or any other type of transaction characterized by an agreement to execute or consummate the transaction at a specified future date.

The transaction currency designation may include a pair of currencies. For example, in foreign exchange transactions, transaction currency designations consist of a base currency and a counter currency. Thus, in a foreign exchange transaction comprising an agreement to trade Japanese yen for U.S. dollars on a specific date at a certain exchange rate, the designated currency pair would consist of a base currency of Japanese yen (JPY) and a counter currency of U.S. dollars (USD). The convention when writing the currency pair is to put the base currency first and the counter currency second, as in "JPY/USD." In a preferred embodiment, the transaction currency pair may be used to determine the set of market-related event dates that are displayed or highlighted in the electronic market calendar.

Settlement Date Calculator 104 generates a set of standard settlement dates (for example, the standard set of forward tenors in a foreign exchange transaction) based on a transaction type and/or a transaction date submitted by a user through Input Control Facility 116, or alternatively provided by another computer process (not depicted in FIG. 1). In a preferred embodiment, the transaction date defaults to the current date if the user or automated computer process does not select or provide one. The calculation of settlement dates may be accomplished by any number of means known in the art, including but not limited to, using a computer algorithm designed to count days and identify calendar dates according to the standards and conventions associated with the transaction type and/or the particular market to which the system is applied.

A preferred embodiment of an electronic market calendar according to the present invention also includes a Holiday Date Generator 114, which is configured to retrieve holidays from Holiday Data Sets 112 based generally on a set of transaction terms (and more particularly on the region, territory or currency designation in the set of transaction terms) submitted or selected by a user through Input Control Facility 116, or otherwise automatically provided by another computer process (not depicted in FIG. 1). Each holiday data set contains a complete set of official holidays pertaining to a particular region, territory or country of the world. In a preferred embodiment, Holiday Data Sets 112 would also recognize unofficial holidays for each region or territory (e.g., the Friday after Thanksgiving, December $24^{th}$, or the week between Christmas and January $1^{st}$) because the large number of business closures and employee vacations occurring on these dates can have a significant impact on one's ability to complete business transactions. For purposes of the present invention, Holiday Data Sets 112 may or may not physically reside in the same computer system or the same memory storage area as Market-Related Event Data Sets 110.

Input Control Facility 116 may comprise any number of well known software or hardware user-activatible input control devices, such as keyboards, mice, touch-screens, stylus pens and pads, radio buttons, drop-down menus, scroll-bars, thumb-wheels, dialogue boxes, etc.

Display Controller 106 receives the appropriate market-related events from Event-Date Generator 102, the appropriate settlement dates from Settlement Calculator 104, and the appropriate holiday dates from Holiday Generator 114, and, in a preferred embodiment, formats all of this information for display in an electronic market calendar displayed on Display Device 108, which is coupled to Display Controller 106 through an interconnected computer network or by other means known in the art. Display Device 108 may be a computer screen, a television monitor or a handheld wireless device, such as a personal digital assistant (PDA). Examples of the various formats in which the market calendar and the selected market-related events, settlement dates and holidays may be displayed on Display Device 108 are described below with reference to FIGS. 3 and 4.

In the example shown in FIG. 1, Market-Related Event Data Sets 110 and Holiday Data Sets 112 are depicted as residing in the same computer system as Event-Date Generator 102, Settlement Date Calculator 104, Display Controller 106 and Display Device 108. It would be apparent to one of skill in the art, however, that embodiments in which market-related events and holidays are stored in data sets residing on remote computers—coupled to the other components of the system through a wired or wireless network or Internet connection—are also considered to be within the scope of the present invention. It should also be apparent to those skilled in the art that the present invention is not limited to applications where an actual display of the market-related events, settlement dates and holidays is necessary. Thus, it will be understood that the present invention can be beneficially applied to applications where the market-related event data, settlement dates and holidays are provided, for example, to another computer process, instead of displayed.

In a preferred embodiment, the market-related event data sets and holiday data sets are stored in a number of different languages to facilitate multilingual operation of Electronic Market Calendar 100. With this functionality, for example, a user may elect to view the market calendar, market related event data and holidays in his or her own language, or alternatively, in the language corresponding to the region, territory or currency of interest. Another alternative considered to be within the scope of the invention is to dynamically generate the market-related event data sets and holiday data sets according to information supplied by resources other than the data set storage areas depicted in FIG. 1, such as real-time news and information feeds or direct connections to computers or websites operated by the banking and other financial and corporate institutions engaged in the business of executing the proposed market transactions.

Figure 2:
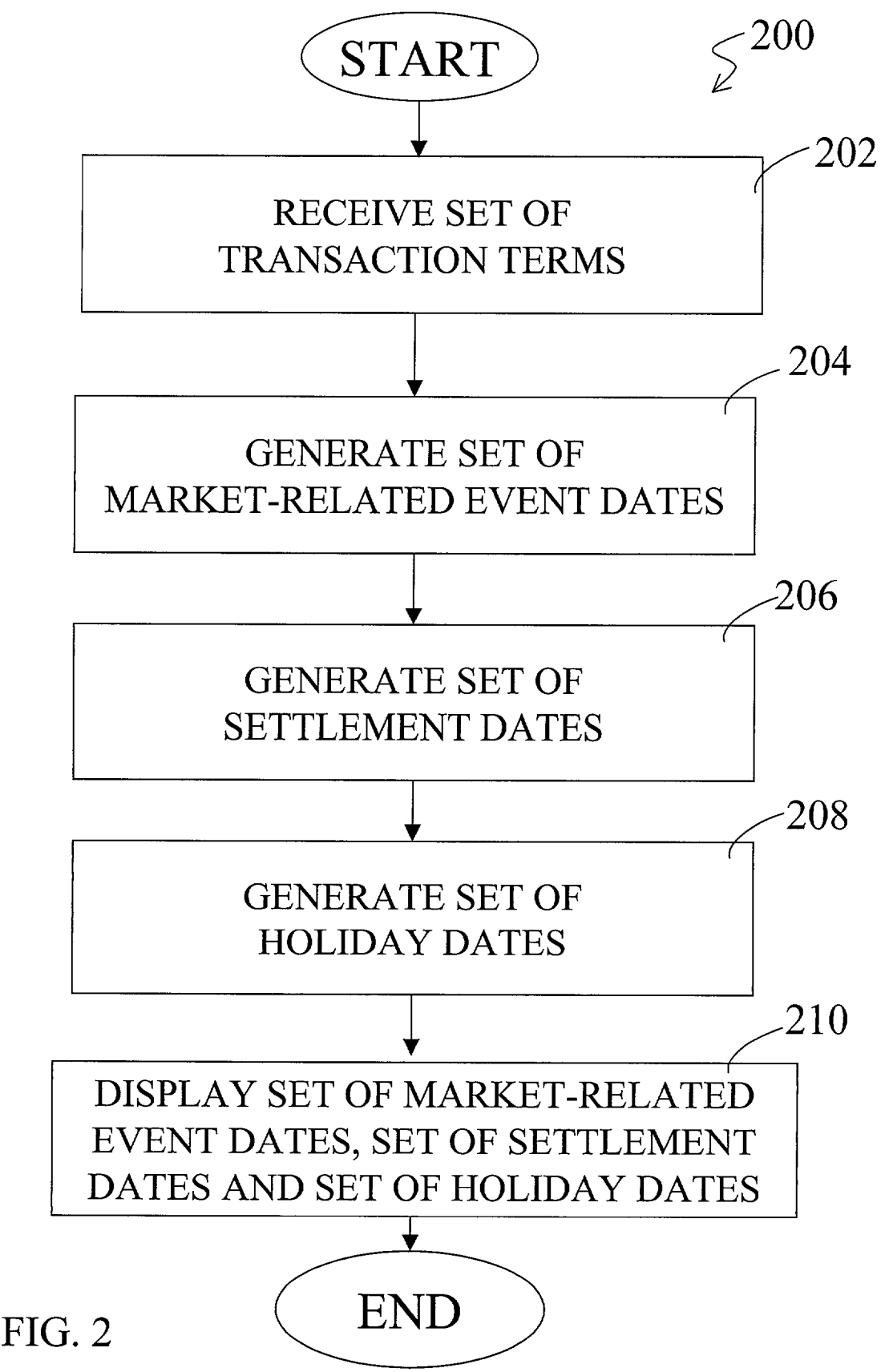
FIG. 2 is a flow diagram illustrating the steps performed by an embodiment of an electronic market calendar configured in accordance with the present invention.

FIG. 2 shows a flow diagram 200 illustrating the steps performed by an embodiment of an electronic market calendar configured in accordance with the present invention. Beginning with step 202 of FIG. 2, a set of transaction terms is received. The transaction terms may be provided via an input control configured to accept input from a user (as discussed below with reference to FIGS. 4A and 4B), or it may be provided by operation of a separate automated program or process. Based on the set transaction terms, and more particularly to a transaction type, transaction date or transaction currency, a set of market-related event dates, a set of settlement dates and a set of holiday dates are generated. (See steps 204, 206 and 208 in FIG. 2). Finally, in step 210, the market-related event dates, settlement dates and holiday dates are displayed in a market calendar in such a manner as to be visibly distinguishable from the rest of the dates displayed in the calendar. In a preferred embodiment, the market-related event dates, settlement dates and holiday dates are displayed in a manner such that they are also visibly distinct from each other, as well as being visibly distinct from the calendar dates that do not correspond to market-related event dates, settlement dates or holiday dates.

Figure 3:
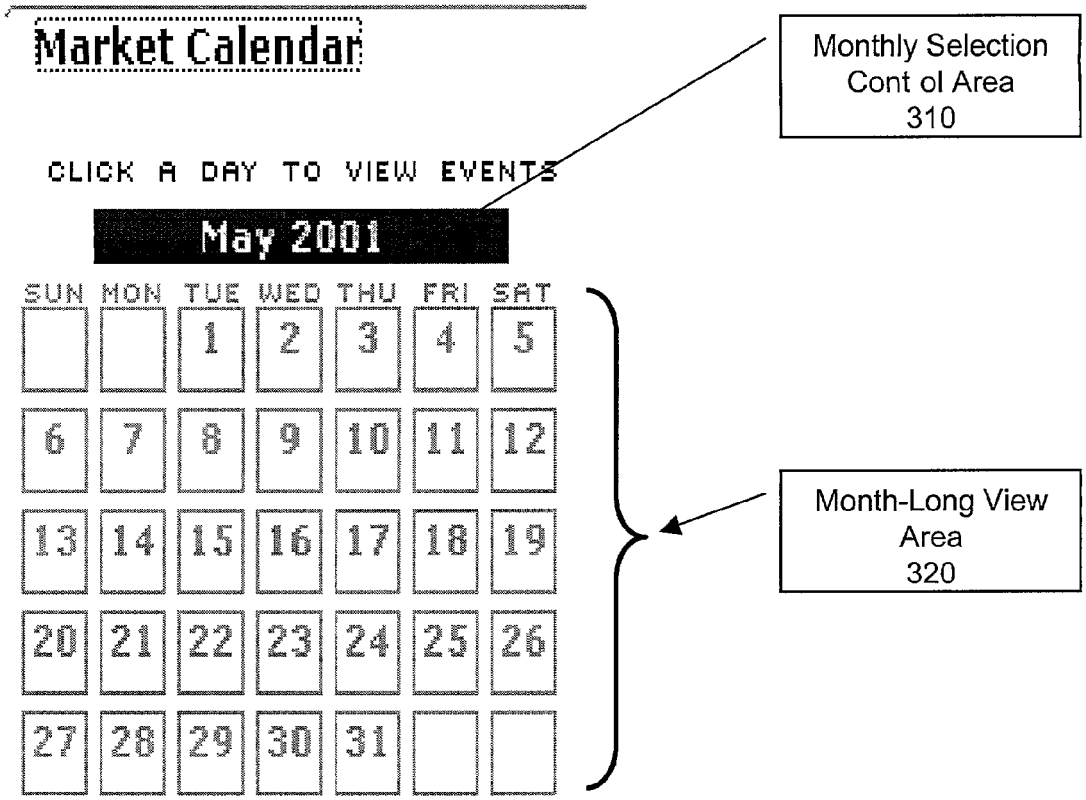
FIG. 3 shows an exemplary embodiment of a user interface screen configured, in accordance with one aspect of the present invention, to display a month-long calendar of settlement dates, holidays and market-related events.

FIG. 3 shows an exemplary embodiment of a user interface screen configured, in accordance with one aspect of the present invention, to display a month-long calendar and the market-related event dates, settlement dates and holidays associated with a selected date. As can be seen in the embodiment depicted in FIG. 3, the month-long calendar view screen comprises a Monthly Selection Control Area 310, a Month-long View Area 320, a Region Selection Control Area 330 and a Holiday and Event Detail Area 340. In this embodiment, a user may view event and holiday data in the currently selected month by clicking on any date shown in Month-long View Area 320. Responsive to such a selection, a list of market-related events, e.g., economic data releases, and holidays occurring on the selected day will be displayed in Holiday and Event Detail Area 340. In alternative embodiments, the holiday and event data may also be represented or denoted directly on the appropriate calendar days displayed in Month-long View Area 320, depending on the application in which the application is being used, or on factors such as the size and resolution of the viewable area on the display device.

In the embodiment depicted in FIG. 3, clicking on the right end of the horizontal bar showing the selected month in Monthly Selection Control Area 310 will load the calendar, market-related events and holidays for the next month. Likewise, clicking on the left end of the horizontal bar in Monthly Selection Control Area 310 will load the calendar, market-related events and holidays for the previous month. Preferably, although not necessarily, a standard set of settlement dates for the selected month (e.g., the second business day after the transaction date for spot transactions, as well as the 1-week forward date) will be highlighted in Month-long View Area 320.

In the embodiment depicted in FIG. 3, a user may choose to view market-related events and holidays from four regions, which can be accessed by clicking on the tabs contained in Region Selection Control Area 330 designated "ALL," "ASIA," "Europe" and "AMERICAS." To view all market-related events and holidays for a selected day, the user may select the "ALL" tab. To view events and holidays occurring in a particular region, the user may select any one of the tabs designated "ASIA," "Europe" and "AMERICAS" in Region Selection Control Area 330. It will be understood by those in the art that the embodiment depicted in FIG. 3 is but one example of an arrangement of view areas and controls for a user interface screen configured according to the present invention. Those in the art will recognize, for example, that any number of region selection tabs for any number of regions may be added to Region Selection Control Area 330 without departing from the scope of the present invention.

Figure 4A:
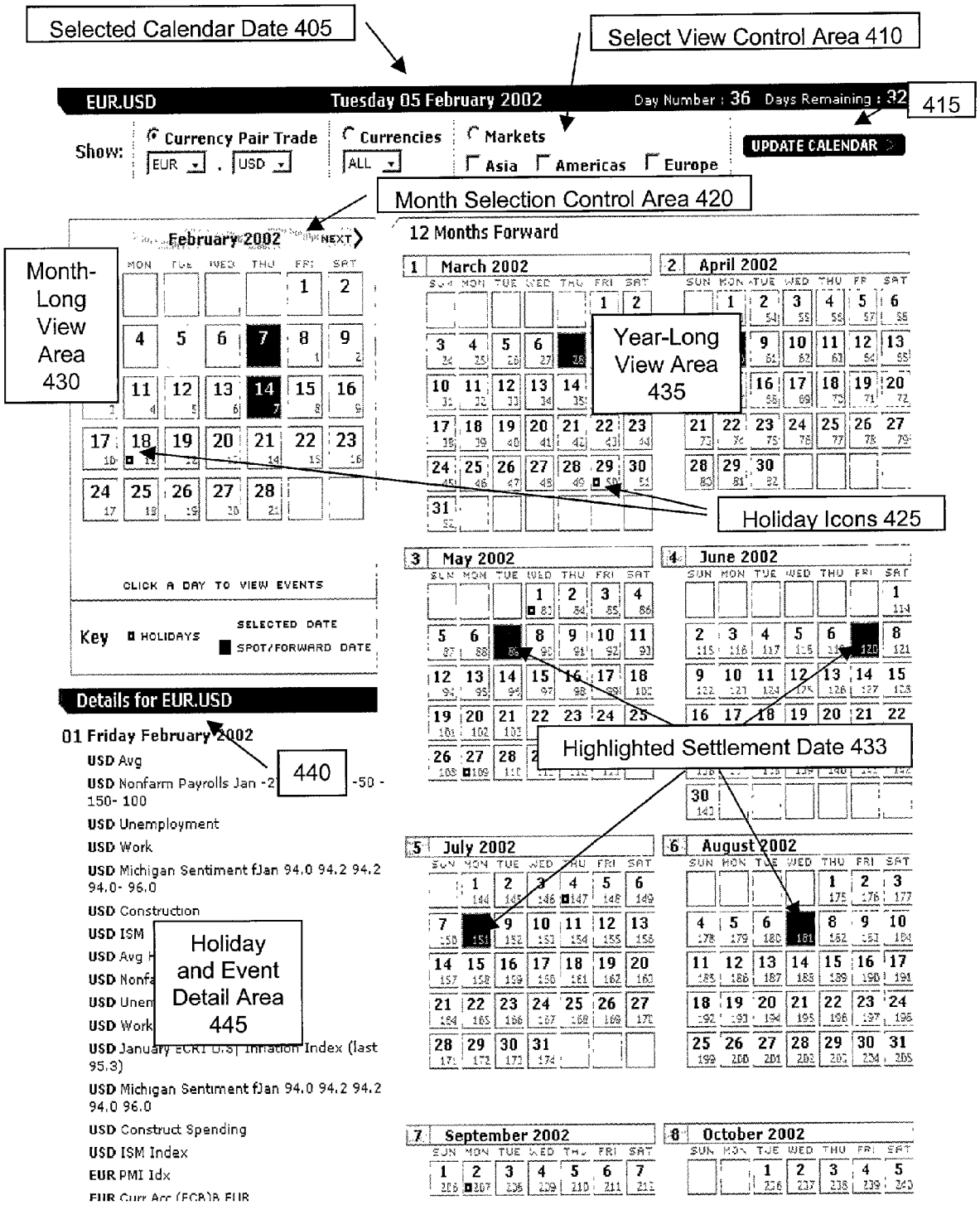

FIGS. 4A and 4B show an exemplary embodiment of another user interface screen configured, in accordance with another aspect of the present invention, to display both a one-month view and a one-year view of a calendar of settlement dates, holidays and market-related events. FIGS. 4A and 4B also illustrate how a user interface screen may be configured, in accordance with this aspect of the present invention, to provide controls for receiving user input and for obtaining additional news, information and research materials pertaining to a set of transaction terms, a currency selection or a set of market-related events. In this embodiment, the user interface screen generally comprises a Select View Control Area 410, a Month Selection Control Area 420, a Month-long View Area 430, a Year-long View Area 435, a Holiday and Events Detail Area 445, a Settlement Date List Area 450 and a News and Research Link Area 455. FIG. 4A shows the top portion of the example user-interface screen and FIG. 4B shows the bottom portion of the same screen. It will be understood, however, that two different screens could be used to show the items depicted in FIGS. 4A and 4B without departing from the scope of the invention.

In the embodiment shown in FIG. 4A, the currently selected month is displayed in Month-long View Area 430, and the twelve months immediately following the selected month are displayed in smaller calendars located in Year-long View Area 435. Selecting (clicking on) any day in Month-long View Area 430 will display the settlement dates, holidays and events for the selected day and, in a preferred embodiment, the next several days immediately following the selected day. These holidays and events are displayed in Holiday and Events Detail Area 445, and may optionally be denoted or represented on the appropriate dates displayed in Month-long View Area 430 and Year-long View Area 435. In the example depicted in FIG. 4A, for example, holidays are denoted in Month-long View Area 430 and Year-long View Area 435 with Holiday Icons 425, while the settlement dates are denoted in Month-long View Area 430 and Year-long View Area 435 with a distinct foreground and background color. The icons denoting holidays and the distinct foreground and background colors denoting settlement dates are also used, in a preferred embodiment of the present invention, to identify additional holidays and settlement dates in Year-long View Area 435. (See Highlighted Settlement Date 433 in FIG. 4A). In addition or as an alternative to using special icons and colors to represent holidays and settlement dates, the system may optionally be implemented by using special fonts, blinking or underlined characters, or even pictures, to represent the appropriate settlement dates and holidays. In a preferred embodiment, the Selected Calendar Date 405 is printed at the top of the user interface screen and every calendar date shown in Month-long View Area 430 and Year-long View Area 435 also contains a number (not shown in FIGS. 4A and 4B) representing the number of days between that calendar date and the Selected Calendar Date 405.

By clicking on the input controls located in Select View Control Area 410, the user may select which currency pairs, currencies or market regions will be displayed. Preferably a title bar (designated with reference number 440 in FIG. 4A) located in Holiday and Event Details Area 445 indicates to the user which currency pair is currently selected. An Update Calendar 415 control is provided to refresh the user interface screen after a change has been made in Select View Control Area 410. Clicking on the right or left ends of the horizontal bar in Month Selection Control Area 420 loads the calendar, settlement dates, holidays and market-related event dates for the next or previous month. In a preferred embodiment, the entire user interface screen is refreshed when the left or right end of the horizontal bar in Month Selection Control Area 420 is clicked.

Turning now to FIG. 4B, Settlement Dates List Area 450 provides a list of the standard forward tenors (i.e., 1 week, 1 month, 2 months, etc.) pertaining to Selected Calendar Date 405 in FIG. 4A. News and Research Link Area 455 provides links to facilitate obtaining news, information and research materials pertaining to the selected currency pair or region. By clicking on items in News and Research Link Area 455, for example, a user may be able to obtain the top news stories associated with the territories or currencies associated with the transaction, or receive electronic or hardcopy reports of research and analysis concerning the market-related events shown in Holiday and Events Detail Area 445 (shown in FIG. 4A).

In a preferred embodiment, the invention is operable in two user interface modes, the first user interface mode being the month-long calendar view described above with reference to FIG. 3, and the second user interface mode being the combined month-long and year-long calendar views described above with reference to FIGS. 4A and 4B.

Figure 5:
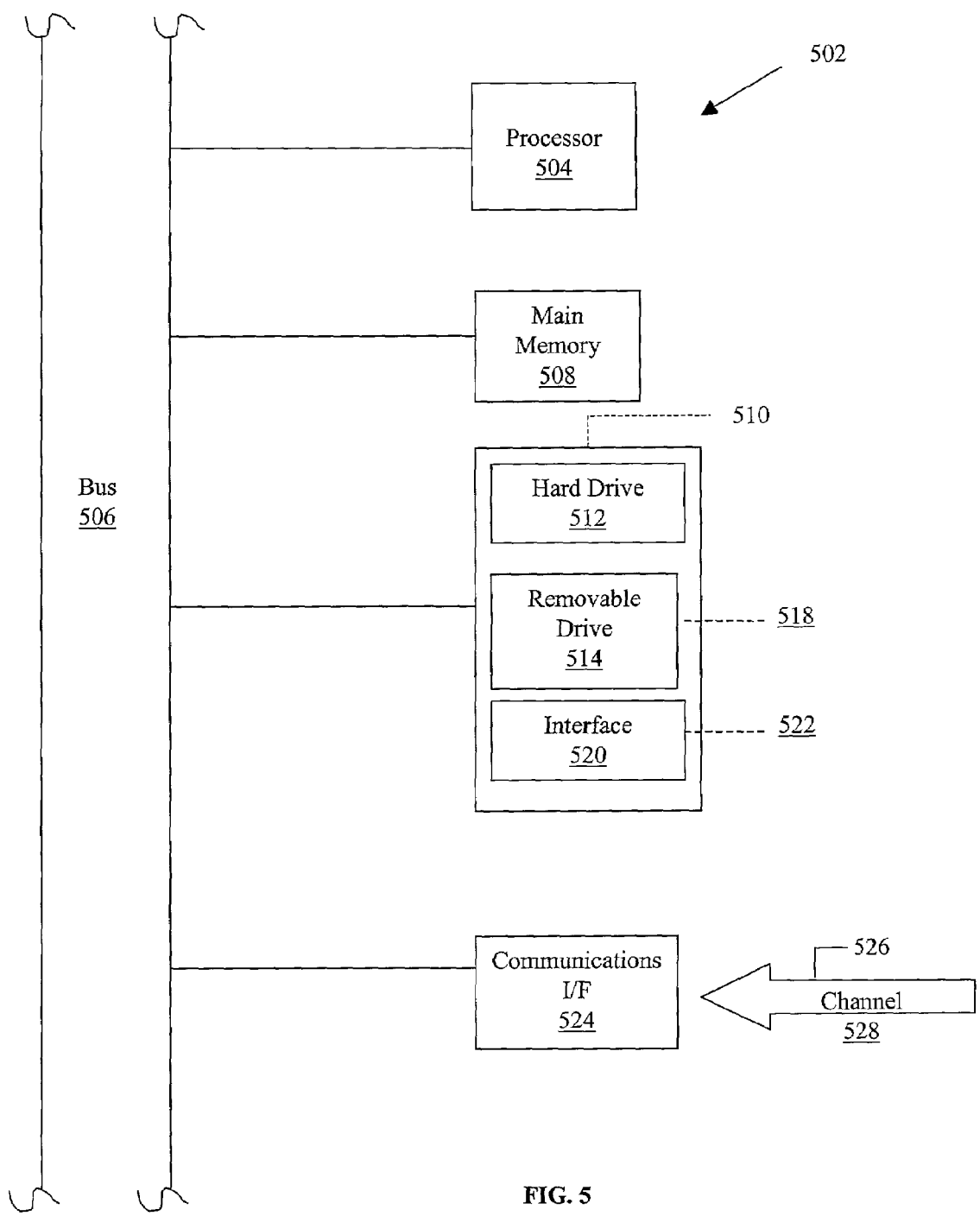
FIG. 5 is a block diagram of a computer system as may be used to implement an embodiment of the invention.

With reference now to FIG. 5, a description of a computer system suitable for use with an embodiment of the present invention is provided. The computer system 502 includes one or more processors, such as a processor 504. The processor 504 is connected to a communication bus 506. Various software embodiments are described in terms of this exemplary computer system. After reading this description, it will become apparent to a person skilled in the relevant art how to implement the invention using other computer systems and/or computer architectures.

The computer system 502 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. The removable storage unit 518, represents a floppy disk, magnetic tape, optical disk, etc. which is read by and written to by the removable storage drive 514. As will be appreciated, the removable storage unit 518 includes a computer usable storage medium having stored therein computer software and/or data.

In alternative embodiments, the secondary memory 510 may include other similar means for allowing computer programs or other instructions to be loaded into the computer system 502. Such means can include, for example, a removable storage unit 522 and an interface 520. Examples of such can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to the computer system 502.

The computer system 502 can also include a communications interface 524. The communications interface 524 allows software and data to be transferred between the computer system 502 and external devices. Examples of the communications interface 524 can include a modem, a network interface (such as an Ethernet card), a communications port, a PCMCIA slot and card, etc. Software and data transferred via the communications interface 524 are in the form of signals 526 that can be electronic, electromagnetic, optical or other signals capable of being received by the communications interface 524. Signals 526 are provided to communications interface via a channel 528. A channel 528 carries signals 526 and can be implemented using wire or cable, fiber optics, a phone line, a cellular phone link, an RF link and other communications channels.

In this document, the term "computer-readable storage medium" is used to generally refer to media such as the removable storage device 518, a hard disk installed in hard disk drive 512, and signals 526. These media are means for providing software and operating instructions to the computer system 502.

Computer programs (also called computer control logic) are stored in the main memory 508 and/or the secondary memory 510. Computer programs can also be received via the communications interface 524. Such computer programs, when executed, enable the computer system 502 to perform the features of the present invention as discussed herein. In particular, the computer programs, when executed, enable the processor 504 to perform the features of the present invention. Accordingly, such computer programs represent controllers of the computer system 502.

In an embodiment where the invention is implemented using software, the software may be stored in a computer-readable storage medium and loaded into the computer system 502 using the removable storage drive 514, the hard drive 512 or the communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

The present invention has been disclosed and described herein in what is considered to be its most preferred embodiments. It should be noted that variations and equivalents may occur to those skilled in the art upon reading the present disclosure and that such variations and equivalents are intended to come within the scope of the invention and the appended claims, should be understood by one skilled in the art that the present invention is not limited to financial or currency transactions, and may be used for other types of transactions as described above.

What is claimed is:

1. A computer-readable storage medium encoded with a program executable by a computer for display of an electronic market calendar to a user, the program comprising:
   a settlement date calculator configured to identify and generate a set of standard settlement dates based on a set of transaction terms;
   an event-date generator configured to identify and generate a set of future market-related event dates based on a set of transaction terms;
   a holiday date generator configured to identify and generate a set of holiday dates pertaining to a territory associated with the set of transaction terms; and
   a display controller configured to display on a display device a plurality of calendar dates including the set of standard settlement dates, the set of future market-related event dates and the set of holiday dates;
   wherein each one of the plurality of calendar dates that corresponds to a member of the set of standard settlement dates is displayed in a visibly distinct manner from each one of the plurality of calendar dates that does not correspond to a member of the set of standard settlement dates,
   each one of the plurality of calendar dates that corresponds to a member of the set of future market-related event dates is displayed in a visibly distinct manner from each one of the plurality of calendar dates that does not correspond to a member of the set of future market-related event dates, and
   each one of the plurality of calendar dates that corresponds to a member of the set of holiday dates is displayed in a visibly distinct manner from each one of the plurality of calendar dates that does not correspond to a member of the set of holiday dates.

2. The computer-readable storage medium of claim 1, wherein the set of future market-related event dates comprises a date corresponding to at least one of the following:
   a national election,
   an economic forecast,
   a release of an economic report,
   a monetary policy announcement,
   a trade announcement,
   an interest rate announcement,
   a press release,
   a governmental hearing,
   a federal open market committee meeting, and
   a financial summit meeting.

3. The computer-readable storage medium of claim 1, wherein the set of transaction terms comprises:
   a transaction type;
   a transaction date; and
   a transaction currency designation.

4. The computer-readable storage medium of claim 3, wherein the transaction type is at least one of the following:
   a foreign exchange transaction,
   a spot transaction,
   a currency swap,
   a forward contract,
   a futures contract,
   a money-market transaction,
   a bond transaction,
   a derivative contract, and
   an option contract.

5. The computer-readable storage medium of claim 3, wherein the transaction currency designation comprises a pair of currencies.

6. The computer-readable storage medium of claim 3, wherein the event-date generator determines the set of future market-related event dates based on the transaction currency designation.

7. The computer-readable storage medium of claim 1, wherein the territory comprises at least one of the following:
   the world,
   a plurality of countries,
   a continent,
   a geographic region,
   a country,
   a state within a country,
   a county, and a city.

8. A computer-readable storage medium encoded with a program executable by a computer for display of an electronic market calendar to a user, the program comprising:
   an input control facility configured to accept from a user a selection of a set of transaction terms for a transaction;
   a settlement date calculator configured to identify and generate a set of standard settlement dates based on the set of transaction terms;
   an event-date generator configured to identify and generate a set of future market-related event dates based on the set of transaction terms; and
   a display controller configured to display on a display device a plurality of calendar dates, a settlement date list showing the members of the set of standard settlement dates and an event date list showing the members of the set of future market-related event dates.

9. The computer-readable storage medium of claim 8 wherein:
   each one of the plurality of calendar dates that corresponds to a member of the set of standard settlement dates is displayed in a visibly distinct manner from each one of the plurality of calendar dates that does not correspond to a member of the set of standard settlement dates.

10. The computer readable storage medium of claim 8 wherein:
    each one of the plurality of calendar dates that corresponds to a member of the set of future market-related event dates is displayed in a visibly distinct manner from each one of the plurality of calendar dates that does not correspond to a member of the set of future market-related event dates.

11. The computer-readable storage medium of claim 8 wherein the set of future market-related event dates comprises a date corresponding to at least one of the following:
    a national election,
    an economic forecast,
    a release of an economic report,
    a monetary policy announcement,
    a trade announcement,
    an interest rate announcement,
    a press release,
    a congressional hearing,
    a federal open market committee meeting, and
    a financial summit meeting.

12. The computer-readable storage medium of claim 8, wherein the set of transaction terms comprises:

a transaction type;
a transaction date; and
a transaction currency designation.

13. The computer-readable storage medium of claim 12, wherein the transaction type is at least one of the following:
    a foreign exchange transaction,
    a spot transaction,
    a currency swap,
    a forward contract,
    a futures contract,
    a money market transaction,
    a bond transaction,
    a derivative contract, and
    an option contract.

14. The computer-readable storage medium of claim 12, wherein the transaction currency designation comprises a pair of currencies.

15. The computer-readable storage medium of claim 12, wherein the event-date generator identifies and determines the set of future market-related event dates based on the transaction currency designation.

16. The computer-readable storage medium of claim 12, wherein the program is operable in a first mode of operation and a second mode of operation, wherein
    in the first mode of operation, the set of standard settlement dates and the set of future market-related event dates fall within one month of the transaction date; and
    in the second mode of operation, the set of standard settlement dates and the set of future market-related event dates fall within one year of the transaction date.

17. The computer-readable storage medium of claim 8, wherein
    the program further comprises a holiday date generator configured to identify and generate a set of holiday dates pertaining a territory associated with the set of transaction terms; and
    the display controller is configured to display on the display device a holiday list showing the members of the set of holiday dates.

18. The computer-readable storage medium of claim 17, wherein:
    each one of the plurality of calendar dates that corresponds to a member of the set of holiday dates is displayed in a visibly distinct manner from each one of the plurality of calendar dates that does not correspond to a member or the set of holiday dates.

19. The computer-readable storage medium of claim 17, wherein the territory is selected by the user.

20. The computer-readable storage medium of claim 17, wherein the territory is determined based on a transaction currency designation.

21. The computer-readable storage medium of claim 17, wherein the territory comprises at least one of the following:
    the world,
    a plurality of countries,
    a continent,
    a geographic region,
    a country,
    a state within a country,
    a county, and
    a city.

22. The computer-readable storage medium of claim 17, wherein the set of holiday dates comprises a set of national holiday dates for the territory.

23. An electronic market calendar system, comprising:
    a first memory storage area containing a plurality of future market-related event data sets, each market-related event data set based on at least one of a plurality of territories;
    an event date generator configured to identify and generate a set of future market-related event dates based on a set of transaction terms and at least one of the plurality of future market-related event data sets;
    a settlement date calculator configured to identify and generate a set of standard settlement dates based on the set of of transactiton terms;
    a display controller, responsive to the event date generator and the settlement date calculator, configured to display to a user a calendar comprising a plurality of calendar dates, including the set of future market-related event dates and the set of standard settlement dates, wherein
    each one of the plurality of calendar dates that corresponds to a member of the set of future market-related event dates is displayed in a visibly distinct manner from each one of the plurality of calendar dates that does not correspond to a member of the set of future market-related event dates, and
    each one of the plurality of calendar dates that correspond to a member of the set of standard settlement dates is displayed in a visibly distinct manner from each one of the plurality of calendar dater that does not correspond to a member of the set of standard settlement dates.

24. The electronic market calendar system of claim 23, further comprising:
    a second memory storage area containing a plurality of holiday data sets, each holiday data set pertaining to one of the plurality of territories; and
    a holiday date generator configured to generate a set of holiday dates based on the set of transaction terms and at least one of the plurality of holiday data sets;
    wherein each one of the plurality of calendar dates that corresponds to a member of the set of holiday dates is visibly distinguished from each one of the plurality of calendar dates does not correspond to a member of the set of holiday dates.

25. An electronic market calendar system, comprising:
    means for acquiring a set of transaction terms;
    means, responsive to the means for acquiring, for generating a set of future market-related event dates, based on the set of transaction terms, for at least one of a plurality of territories;
    means for generating a set of standard settlement dates based on the set of transaction terms;
    means for displaying to a user a calendar comprising a plurality of calendar dates, the plurality of calendar dates including the set of future market-related event dates and the set of standard settlement dates, wherein
    each one of the plurality of calendar dates that corresponds to a member of the set of future market-related event dates is visibly distinguished from each one of the plurality of calendar dates that does not correspond to a member of the set of future market-related event dates, and
    each one of the plurality of calendar dates that corresponds to a member of the set of standard settlement dates is visibly distinguished from each one of the plurality of calendar dates that does not correspond to a member of the set of standard settlement dates.

26. The electronic market calendar system of claim 25, further comprising:

means for generating a set of holiday dates based on the set of transaction terms;

wherein the plurality of calendar dates further includes the set of holiday dates; and each one of the plurality of calendar dates that corresponds to a member of the set of holiday dates is visibly distinguished from each one of the plurality of calendar dates that does not correspond to a member of the set of holiday dates.

27. The electronic market calendar system of claim 25, further comprising:

an input control configured to accept a selection of the set of transaction terms from the user.

28. A method for displaying a market calendar, comprising:

inputting into an input control facility a set of transaction terms;

identifying and generating a set of future market-related event dates based on the set of transaction terms;

identifying and generating a set of standard settlement dates based on the set of transaction terms; and displaying a calendar having a plurality of calendar dates to a user, including the set of standard settlement dates and the set of future market-related event dates;

wherein each one of the plurality of calendar dates that corresponds to a member of the set of future market-related event dates is visibly distinguished from each one of the plurality of calendar dates that does not correspond to a member of the set of future market-related event dates, and each one of the plurality of calendar dates that corresponds to a member of the set of standard settlement dates is visibly distinguished from each one of the plurality of calendar dates that does not correspond to a member of the set of standard settlement dates.

29. The method of claim 28, further comprising:

identifying and generating a set of holiday dates based on the set of transaction terms; and displaying each one of the plurality of calendar dates corresponds to a member of the set of holiday dates in a visibly distinct manner from each one of the plurality of calendar dates that does not correspond to a member of the set of holiday dates.

* * * * *